United States Patent
Francois et al.

(10) Patent No.: US 8,520,960 B2
(45) Date of Patent: Aug. 27, 2013

(54) METHOD FOR DECODING A STREAM OF CODED DATA REPRESENTATIVE OF A SEQUENCE OF IMAGES AND METHOD FOR CODING A SEQUENCE OF IMAGES

(75) Inventors: Edouard Francois, Bourg des Comptes (FR); Dominique Thoreau, Cesson Sevigne (FR); Jerome Vieron, Rennes (FR); Philipe Bordes, Laille (FR)

(73) Assignee: Thomson Licensing, Issy-les-Moulineaux (FR)

( * ) Notice: Subject to any disclaimer, the term of this patent is extended or adjusted under 35 U.S.C. 154(b) by 335 days.

(21) Appl. No.: 12/804,891

(22) Filed: Jul. 30, 2010

(65) Prior Publication Data

US 2011/0026844 A1  Feb. 3, 2011

(30) Foreign Application Priority Data

Jul. 30, 2009  (FR) ...................................... 09 55350

(51) Int. Cl.
*G06K 9/36*  (2006.01)
*G06K 9/46*  (2006.01)

(52) U.S. Cl.
USPC ......................................... 382/238; 382/233

(58) Field of Classification Search
USPC ................................................. 382/232–253
See application file for complete search history.

(56) References Cited

U.S. PATENT DOCUMENTS

| | | | |
|---|---|---|---|
| 6,005,622 A * | 12/1999 | Haskell et al. | ............ 375/240.24 |
| 6,934,419 B2 * | 8/2005 | Zlotnick | ........................ 382/245 |
| 7,409,099 B1 | 8/2008 | Ameres et al. | |
| 2008/0247658 A1 | 10/2008 | Lee et al. | |
| 2009/0060362 A1 * | 3/2009 | Harmanci et al. | ............. 382/238 |
| 2010/0054331 A1 | 3/2010 | Haddad et al. | |
| 2010/0208804 A1 * | 8/2010 | Yu et al. | .................... 375/240.12 |

FOREIGN PATENT DOCUMENTS

| | | |
|---|---|---|
| EP | 1041826 | 10/2000 |
| FR | 2908007 | 5/2008 |
| WO | 2009/007603 A2 | 1/2009 |

OTHER PUBLICATIONS

Robert et al., "Amelioration de codeurs DCT par orientation des blocs de la transformee", Internet Citation, Nov. 9, 2006.
Schiller, "Prediction Signal Controlled Scans for Improved Motion Compensated Video Coding", Electronnics Letters, vol. 29, No. 5, Mar. 4, 1993.
Robert et al., "Improving H.264 Video Coding Through Block Oriented Transforms", ICME 2008, 2008 IEEE, Cedex, France, 2008.
Lee et al., "An Efficient Encoding of DCT Blocks with Block-Adaptive Scanning", 2334b IEICE Transactions on Communications, vol. E77-B, No. 12, Tokyo, Japan, Dec. 1994.
International Search Report dated Feb. 12, 2010.

* cited by examiner

*Primary Examiner* — Li Liu
(74) *Attorney, Agent, or Firm* — Myers Wolin, LLC

(57) ABSTRACT

A method for decoding a stream of coded data representative of a sequence of images divided into blocks is described. It comprises the following steps for a current block:
  reconstructing a residual block of residual data from the decoding of a first part of the coded stream of data relating to the current block,
  determining a prediction block, and
  reconstructing the current block by merging the residual block and the prediction block,
According to the invention, the decoding method comprises in addition a step of reorganization of residual data in the residual block before the reconstruction of the current block according to the content of the prediction block.
The invention also relates to a method for coding.

28 Claims, 8 Drawing Sheets

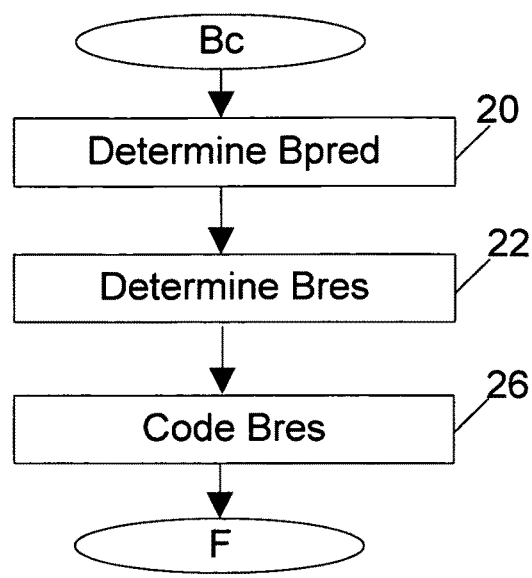
FIGURE 1 – PRIOR ART
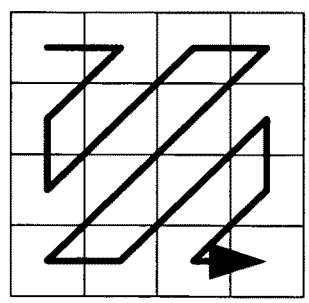
FIGURE 2 – PRIOR ART

METHOD FOR DECODING A STREAM OF CODED DATA REPRESENTATIVE OF A SEQUENCE OF IMAGES AND METHOD FOR CODING A SEQUENCE OF IMAGES

This application claims the benefit, under 35 U.S.C. §119 of French Patent Application 0955350, filed Jul. 30, 2009.

1. SCOPE OF THE INVENTION

The invention relates to the general domain of image coding. More specifically, the invention relates to a method for decoding a coded data stream representative of a sequence of images and a method for coding a sequence of images.

2. PRIOR ART

In reference to FIG. 1, a method for coding a sequence of images divided into blocks in the form of a stream F of coded data is known in the art.

During a step 20, a prediction block Bpred is determined for a current block Bc. For example, the prediction block Bpred is determined from motion data obtained by a block matching type motion estimation method. The block Bpred is determined from a block or several blocks of image(s) Ir other than the image Ic to which belongs the current block Bc (temporal prediction or mode INTER) or from a block or several blocks of the same image (spatial prediction or mode INTRA).

During a step 22, the residual block Bres is determined by extracting from the current block Bc, the prediction block Bpred. For example, the residual block Bres is equal to the pixel to pixel difference between the current block Bc and the prediction block.

During a step 26, the residual block Bres is coded. Generally, the coding step 26 comprises, before the actual coding into a stream F of coded data, the transformation of the residual block Bres into a block of coefficients then the quantization of this block of coefficients into a block of quantized coefficients. The purpose of the transformation and quantization of the residual block Bres, for example using a DCT (Discrete Cosine Transform) is to compact the data in the residual block, i.e. to represent it by a small number of non-null coefficients.

The actual coding of the transformed and quantized residual block, i.e. of the block of quantized coefficients, comprises the entropy coding of quantized coefficients according to a scanning order of coefficients in the block of quantized coefficients. A scanning order known as zigzag scanning is shown in FIG. 2.

Such a coding method is not always efficient in terms of coding cost as it is frequently the case that the data in the transformed and quantized residual block Bres are not very compact. Hence, the entropy coding requires a high number of bits to code the transformed and quantized residual block Bres.

3. SUMMARY OF THE INVENTION

The purpose of the invention is to overcome at least one of the disadvantages of the prior art. For this purpose, the invention relates to a method for decoding a stream of coded data representative of a sequence of images divided into blocks. The decoding method comprises the following steps for a current block:
reconstructing a residual block of residual data from the decoding of a first part of the coded stream of data relating to the current block,
determining a prediction block, and
reconstructing the current block by merging the residual block and the prediction block.

The decoding method comprises in addition a step of reorganisation of residual data in the residual block before the reconstruction of the current block according to the content of the prediction block.

According to a particular embodiment, the step of reconstruction of the residual block comprises the following steps:
decoding the first part of the coded data stream into a block of decoded coefficients according to a scanning order of the block of decoded coefficients determined according to the content of the prediction block,
dequantizing the block of decoded coefficients into a block of dequantized coefficients, and
transforming the block of dequantized coefficients into the residual block.

According to a particular characteristic of the invention, the scanning order is determined according to the following steps:
applying a high pass filter on the prediction block,
reorganising the data in the filtered prediction block in the same way as the residual data in the residual block,
transforming the filtered and reorganised prediction block into a block of coefficients,
determining the scanning order in such a way as to scan the coefficients in descending order of value.

According to a particular aspect of the invention, the step of reorganisation of residual data in the residual block comprises the following steps:
calculating, for at least two spatial directions, a spatial gradients energy level of prediction data, and
determining the reorganisation of residual data according to the spatial direction corresponding to the lowest energy level.

According to a particular characteristic of the invention, the energy level of spatial gradients is calculated for a given spatial direction d according to the following equation:

$$E_d = \sum_{(i,j) \in F_d} |F_d(i,j)| \text{ with } F_d(i,j) = (B_{pred} * D_d)(i,j)$$

where:
(i, j) represents the coordinates of a pixel of the filtered prediction block Bpred,
\* is the convolution operator,
|.| corresponds to a standard operator, and
$D_d$ corresponds to a convolution mask defined by the spatial direction d.

According to another particular characteristic of the invention, the step of reorganisation of residual data in the residual block also comprises a step of calculation of an additional energy level from the energy levels of spatial gradients calculated in at least two spatial directions.

The invention also relates to a method for coding a sequence of images divided into blocks. The coding method comprises the following steps for a current block:
determining a prediction block for the current block,
determining a residual block of residual data by extracting from the current block the prediction block, and
coding the residual block.

The coding method comprises in addition a step of reorganisation of residual data in the residual block before its coding according to the content of the prediction block.

According to a particular embodiment, the step of coding of the residual block comprises the following steps:
- transforming the residual block into a block of coefficients,
- quantizing the block of coefficients into a block of quantized coefficients, and
- coding the quantized coefficients according to a scanning order of the block of quantized coefficients determined according to the content of the prediction block.

Advantageously, the order of scanning is determined according to the following steps:
- applying a high pass filter on the prediction block,
- reorganising the data in the filtered prediction block in the same way as the residual data in the residual block,
- transforming the filtered and reorganised prediction block into a block of coefficients,
- determining the scanning order in such a way as to scan the coefficients in descending order of value.

4. LIST OF FIGURES

The invention will be better understood and illustrated by means of embodiments and advantageous implementations, by no means limiting, with reference to the figures in the appendix, wherein:

FIG. 1 shows a coding method according to the prior art,

FIG. 2 shows a scanning order of a block according to the prior art,

Figure 7:
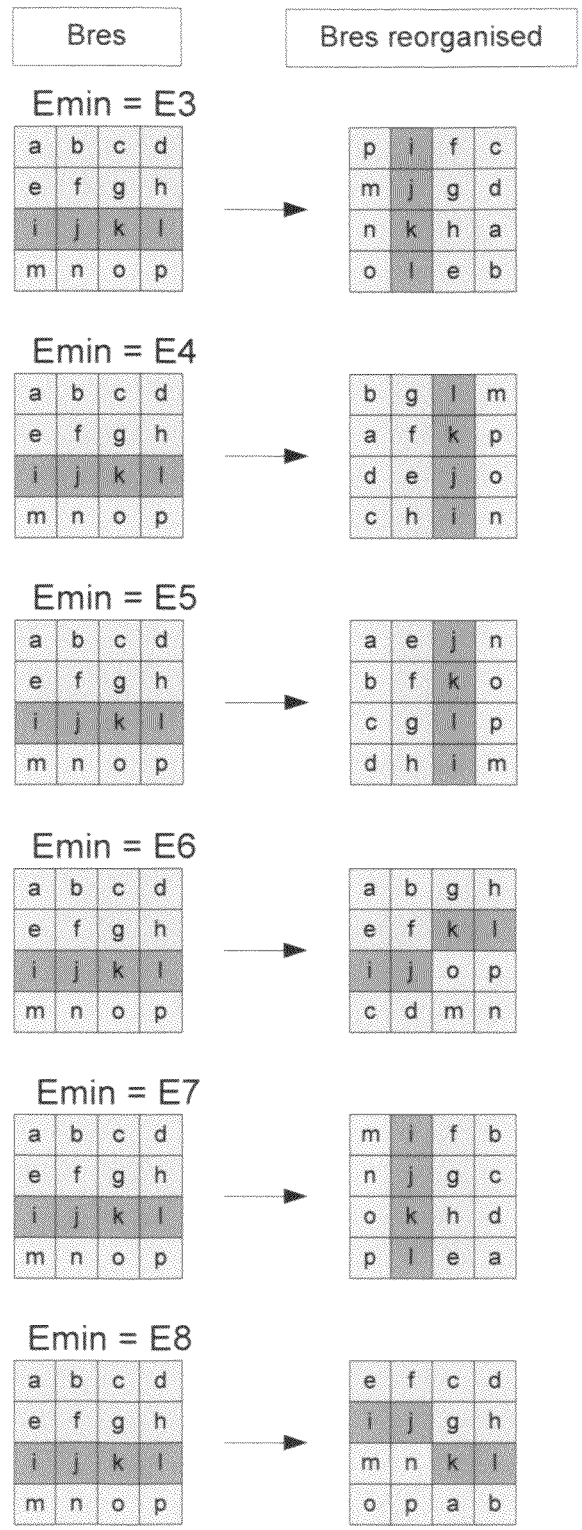
Figure 8:
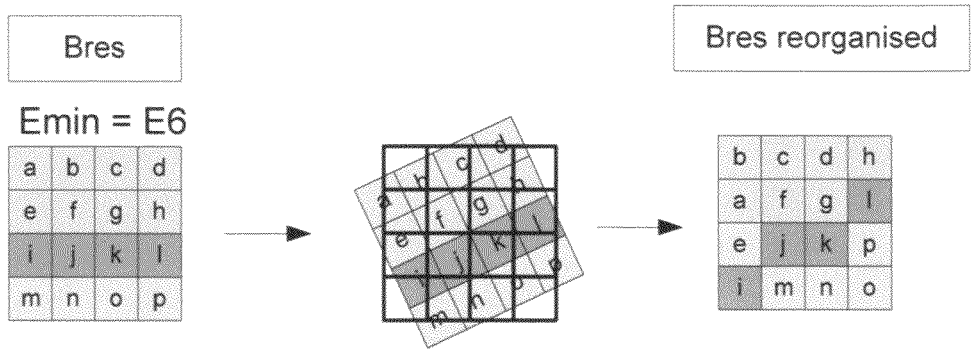
Figure 9:
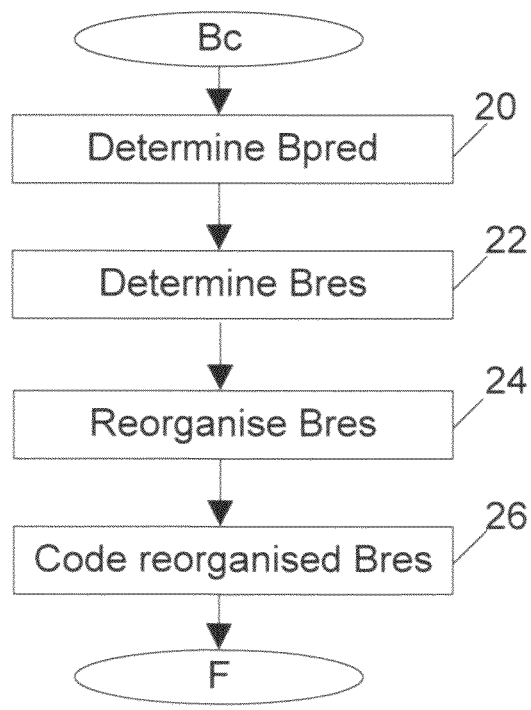
Figure 10:
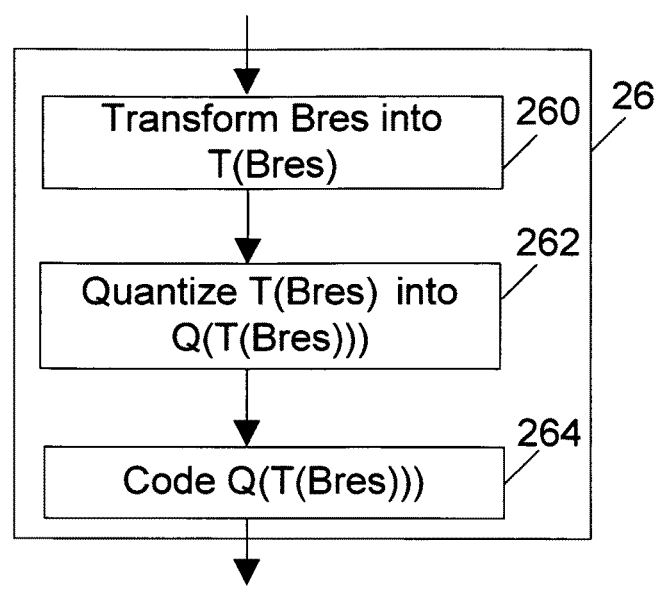
Figure 11:
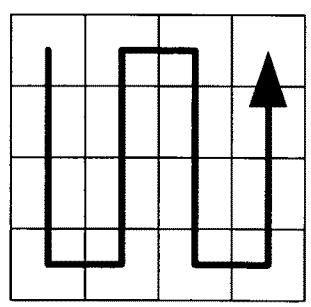
Figure 12:
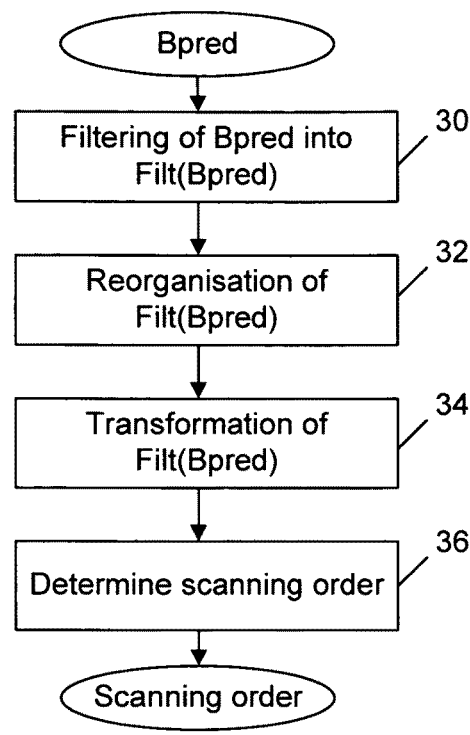
Figure 13:
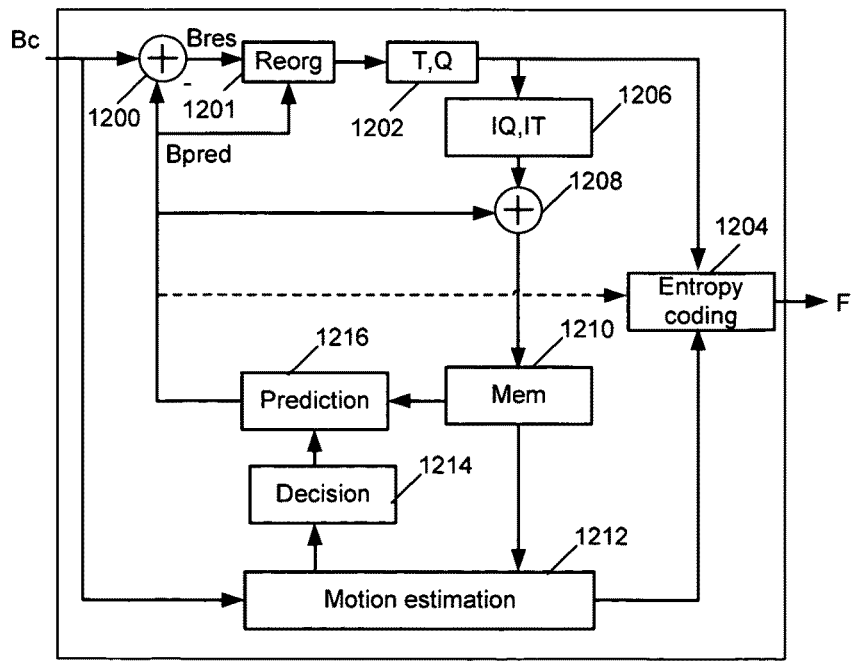
Figure 14:
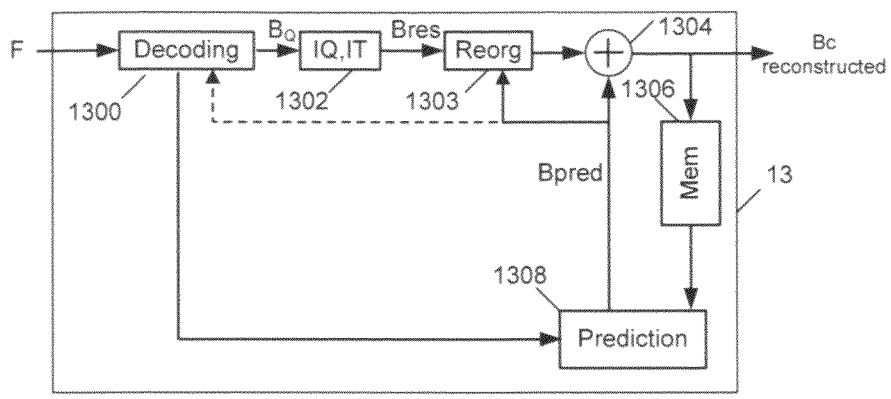
Figure 15:
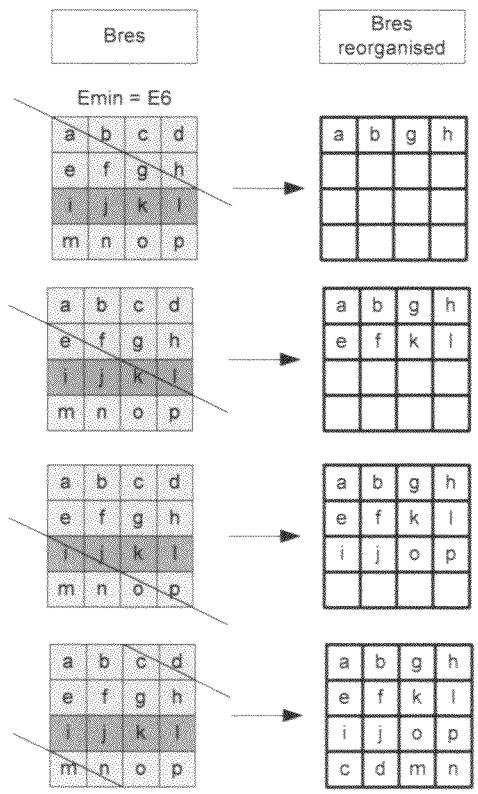

FIG. 7 shows a reorganisation of blocks during the second step of the decoding method according to the invention, FIG. 8 shows a variant of the reorganisation of blocks during the second step of the decoding method according to the invention, FIG. 9 shows a coding method according to the invention, FIG. 10 shows a first step of the coding method according to the invention, FIG. 11 shows a scanning order of a block determined according to the invention, FIG. 12 shows a method for determining a scanning order of a block according to the invention, FIG. 13 shows a coding device according to the invention, FIG. 14 shows a decoding device according to the invention, and FIG. 15 shows a reorganisation of blocks in a particular spatial direction during the second step of the decoding method according to the invention.

5. DETAILED DESCRIPTION OF THE INVENTION

The invention relates to a method for decoding a stream of coded data F representative of a sequence of images and a method for coding a sequence of images into the form of a stream of coded data F. A sequence of images is a series of several images. Each image comprises pixels or image points with each of which is associated at least one item of image data. An item of image data is for example an item of luminance data or an item of chrominance data.

The term "motion data" is to be understood in the widest sense. It comprises the motion vectors and possibly the reference image indexes enabling a reference image to be identified in the image sequence.

The term "residual data" signifies data obtained after extraction of other data. This term is synonymous with the term "residue". A residual block is a block of pixels with which residual data is associated.

The term "transformed residual data" signifies residual data to which a transform has been applied. A DCT (Discrete Cosine Transform) is an example of such a transform described in chapter 3.4.2.2 of the book by I. E. Richardson entitled "H.264 and MPEG-4 video compression", published by J. Wiley & Sons in September 2003. The wavelet transforms described in chapter 3.4.2.3 of the book by I. E. Richardson and the Hadamard transform are other examples. Such transforms "transform" a block of image data, for example residual luminance and/or chrominance data, into a "block of transformed data" also called a "block of frequency data" or a "block of coefficients".

The term "prediction data" signifies data used to predict other data. A prediction block is a block of pixels with which prediction data is associated. A prediction block is obtained from a block or several blocks of the same image as the block that it predicts (spatial prediction or intra-image prediction) or from a (mono-directional prediction) or several blocks (bi-directional prediction) of a different image (temporal prediction or inter-image prediction).

Figure 3:
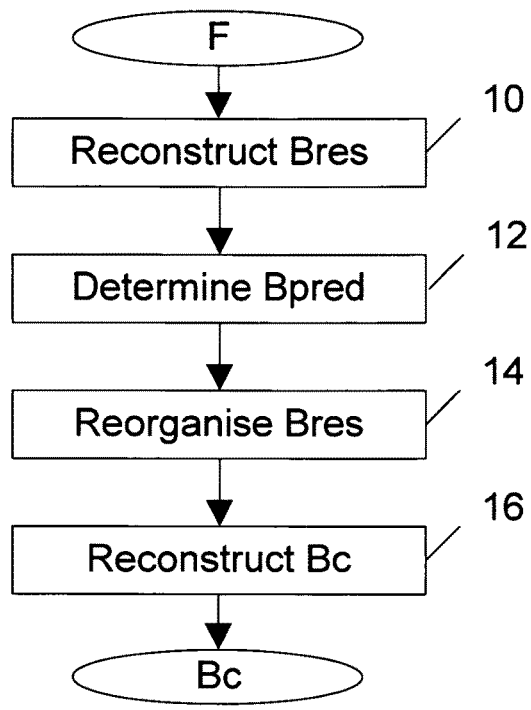
FIG. 3 shows a decoding method according to the invention.

FIG. 3 shows a method for decoding a stream of coded data F representative of a sequence of images divided into blocks. The method is described for a current block Bc and can be applied to several blocks of an image.

Figure 4:
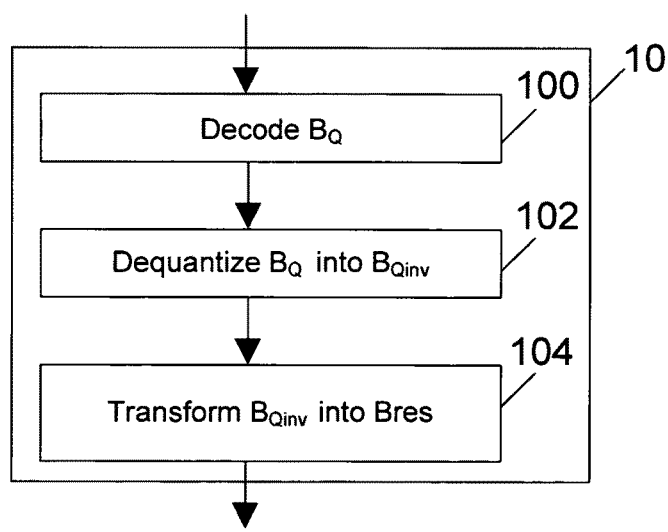
FIG. 4 shows a first step of the decoding method according to the invention.

During a step 10, a residual block Bres is reconstructed by decoding a first part of the stream of coded data F relating to the current block Bc. FIG. 4 shows step 10. This step 10 generally comprises the entropy decoding 100 of this first part of the stream of coded data F into a block of decoded coefficients $B_Q$ according to a scanning order of the block $B_Q$. Step 10 generally comprises the inverse quantization or de-quantization 102 of the block of decoded coefficients $B_Q$ into a block of de-quantized coefficients $B_{Qinv}$ and the inverse transform 104 of the block of de-quantized coefficients $B_{Qinv}$ to obtain the residual block Bres. According to a variant, step 10 comprises only the inverse quantization 102 of decoded coefficients to obtain the residual block Bres.

The invention is in no way limited by the method used to reconstruct the residual block Bres.

According to a particular embodiment the scanning order is fixed and identical for each residual block Bres to be reconstructed. It is for example defined in a video coding standard in which case it is known by the coding method and the decoding method.

According to an embodiment variant, the scanning order is adapted for each residual block Bres to be reconstructed according for example to the content of a prediction block Bpred associated with the residual block Bres. In fact, the data of the prediction block Bpred and the data of the residual block Bres have structural similarities.

During a step 12, a prediction block Bpred is determined for the current block Bc. For example, the prediction block Bpred is determined from the motion data obtained in decoding a second part of the stream of coded data F relating to the current block Bc. According to a variant, the prediction block Bred is determined from reconstructed motion data by a template matching type method. Such a method is described in the document VCEG-AG16 by Steffen Kamp et al entitled *Decoder Side Motion Vector Derivation* and published on 20 Oct. 2007 at Shenzhen in China during the 33rd meeting of the VCEG group of the ITU-T.

During a step 14, the residual block Bres is reorganised according to the content of the prediction block Bpred. More specifically, the residual data of the residual block are reorganised.

During a step 16, the current block Bc is reconstructed by merging the reorganised residual block Bres and the prediction block Bpred. For example, the current block Bc is equal to the pixel by pixel sum of the residual block Bres and the prediction block Bpred. Bc(i,j)=Bres(i,j)+Bpred(i,j), where (i,j) are the pixel coordinates.

According to a variant, the current block Bc is equal to the sum pixel by pixel of the residual block Bres and the prediction block Bpred weighted by a weighting parameter wp: Bc(i,j)=Bres(i,j)+wp*Bpred(i,j).

According to a variant, the current block Bc is equal to the sum of filtered versions of residue and prediction blocks, according to an equation of type $$Bc(i, j) = \sum_{(k,l)} a(k, l) * Bres(i+k, j+l) + wp_{cr\_dec} * \sum_{(k,l)} b(k, l) * Bpred(i+k, j+l)$$

where a(.) and b(.) are the coefficients of linear filters. (k,l) are integer numbers that vary for example from −1 to 1. As a simple example, a( ) may take the following values:

| | | |
|---|---|---|
| 1/64 | −10/64 | 1/64 |
| −10/64 | 100/64 | −10/64 |
| 1/64 | −10/64 | 1/64 | and b( ) the following values

| | | |
|---|---|---|
| 1/16 | 2/16 | 1/16 |
| 2/16 | 4/16 | 2/16 |
| 1/16 | 2/16 | 1/16 |

Figure 5:
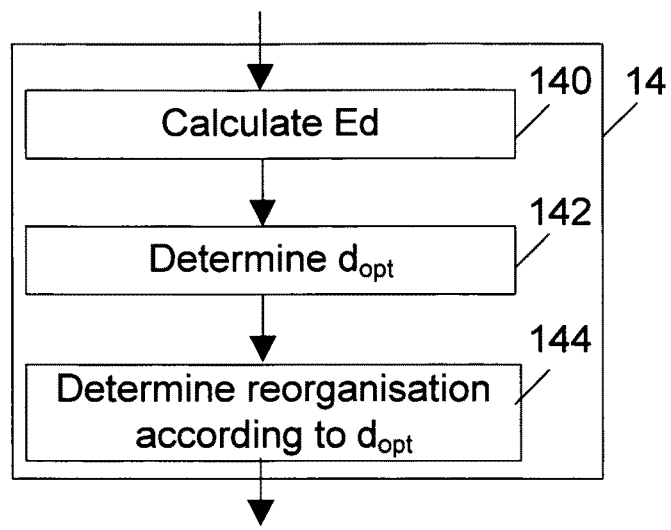
FIG. 5 shows a second step of the decoding method according to the invention.
Figure 6:
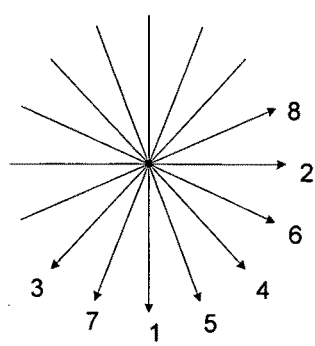
FIG. 6 shows different spatial directions.

FIG. 5 shows in detail step 14 of the coding method according to the invention. Step 14 comprises a calculation step 140 of an energy level of spatial gradients in at least two spatial directions, a step 142 of determination of the lowest energy level Emin and a step 144 of reorganisation of residual data of the residual block according to the determined energy level Emin. According to a first embodiment, during the step 140, an energy level of spatial gradients is calculated for each of the 8 spatial directions shown in FIG. 6. For example, the energy levels of spatial gradients are calculated on the prediction block Bpred from a convolution mask. According to a particular embodiment, the following convolution masks are used to calculate the energy levels of spatial gradients in the 8 spatial directions shown in FIG. 6. The index of the convolution mask represents the index of the spatial direction to which it relates:

$$D_1 = \begin{bmatrix} 0 & -1 & 0 \\ 0 & 0 & 0 \\ 0 & 1 & 0 \end{bmatrix} D_2 = \begin{bmatrix} 0 & 0 & 0 \\ -1 & 0 & 1 \\ 0 & 0 & 0 \end{bmatrix} D_3 = \begin{bmatrix} 0 & 0 & -1 \\ 0 & 0 & 0 \\ 1 & 0 & 0 \end{bmatrix}$$

-continued $$D_4 = \begin{bmatrix} -1 & 0 & 0 \\ 0 & 0 & 0 \\ 0 & 0 & 1 \end{bmatrix} D_5 = \begin{bmatrix} 0 & -1 & 0 \\ 0 & 0 & 0 \\ 0 & 0 & 1 \end{bmatrix} D_6 = \begin{bmatrix} 0 & 0 & 0 \\ -1 & 0 & 0 \\ 0 & 0 & 1 \end{bmatrix}$$

$$D_7 = \begin{bmatrix} 0 & -1 & 0 \\ 0 & 0 & 0 \\ 1 & 0 & 0 \end{bmatrix} D_8 = \begin{bmatrix} 0 & 0 & 1 \\ -1 & 0 & 0 \\ 0 & 0 & 0 \end{bmatrix}$$

The prediction block Bpred is filtered with each of the convolution masks. An energy level of spatial gradients is then calculated from each filter block $F_d$ obtained according to the following equation:

$$E_d = \sum_{(i,j) \in F_d} |F_d(i, j)| \text{ with } F_d(i, j) = (B_{pred} * D_d)(i, j)$$

where:
- (i, j) represents the coordinates of a pixel of the filtered prediction block Bpred,
- d is the index corresponding to the different spatial directions,
- * is the convolution operator,
- |.| corresponds to a selected standard operator, for example, in L1 standard, it corresponds to the absolute value, and in L2 standard, to the square elevation, and
- $D_d$ corresponds to a Prewitt type convolution mask defined by the spatial direction d.

The energy level can be calculated on the luminance data alone or on the chrominance data or again both on the luminance data and chrominance data. According to a first variant, an additional energy level E0 is calculated from the 8 energy levels E1 to E8 as follows:

$$E_0 = \lambda \cdot \sum_{d=1}^{d=8} (E_d),$$

where λ is a weighting coefficient determined such that the energy level E0 is lowest when the energy level of spatial gradients is noticeably uniform in all the directions d tested. A value of λ equal to 0.1 is well suited.

According to a second variant, a sub-set of at least two energy levels of the set {E1, E2, E3, E4, E5, E6, E7 E8} is calculated. For example, only the energy levels E1, E2, E3 and E4 are calculated.

According to a variant of the second variant, an additional energy level E0 is calculated from the energy levels of the sub-set. For example, if only the energy levels E1, E2, E3 and E4 are calculated then the additional energy level E0 is calculated as follows $$E_0 = \lambda \cdot \sum_{d=1}^{d=4} (E_d).$$

Preferentially, A is determined such that this energy level is lowest when the energy level of gradients is noticeably uniform in all the directions tested. A value of λ equal to 0.2 is adapted.

According to a second embodiment, during step 140, an energy level is calculated for each of the 4 spatial directions 1, 2, 3, and 4. The energy levels are calculated as follows:

$$E_2 = \sum_{(i,j) \in B_{pred}} |(B_{pred}(i, j+1) - B_{pred}(i, j)|$$

$$E_1 = \sum_{(i,j) \in B_{pred}} |(B_{pred}(i+1, j) - B_{pred}(i, j)|$$

$$E_3 = 0.7 * \sum_{p \in B_{pred}} |(B_{pred}(i, j+1) - B_{pred}(i+1, j)|$$

$$E_4 = 0.7 * \sum_{(i,j) \in B_{pred}} |(B_{pred}(i, j+1) - B_{pred}(i-1, j)|$$

E2 is the sum on the prediction block Bpred of absolute values of horizontal gradients, E1 is the sum on the prediction block Bpred of absolute values of vertical gradients, E3 and E4 are the sums on the prediction block Bpred of absolute values of diagonal gradients. According to a first variant, an additional energy level E0 is calculated as follows:

$$E_0 = \lambda \cdot \sum_{d=1}^{d=4} (E_d),$$

where $\lambda$ is a weighting coefficient. Preferentially, $\lambda$ is determined such that this energy level is lowest when the energy level of gradients is noticeably uniform in all the directions tested.

According to a second variant of this second embodiment, the energy levels in the 4 intermediary directions E5, E6, E7 and E8 are calculated from 4 energy levels E1 to E4 in the following manner:

$E5=(E_1+E_4)/2$ $E6=(E_4+E_2)/2$ $E7=(E_3+E_1)/2$ $E8=(E_2+E_3)/2$

According to a variant of this second variant, an additional energy level E0 is calculated as follows:

$$E_0 = \lambda \cdot \sum_{d=1}^{d=8} (E_d),$$

where $\lambda$ is a weighting coefficient. Preferentially, $\lambda$ is determined such that this energy level is lowest when the energy level of gradients is noticeably uniform in all the directions tested.

During step 142, the energy levels calculated are compared in order to determine the spatial direction $d_{opt}$ corresponding to the lowest energy level Emin:

$$d_{opt} = \underset{d}{\mathrm{argmin}} Ed.$$

During step 144, the residual data are reorganised in the residual block according to the result of the comparison. More specifically, the residual data are reorganised in the residual block according to the spatial direction $d_{opt}$ corresponding to the lowest energy level Emin. For example, the residual data are reorganised as shown in FIG. 7 in the case of a residual block of size 4×4. Each small case letter represents a pixel of a residual block. When the lowest energy level Emin determined in step 142 is E0, E1 or E2 then the residual data of Bres are not reorganised. The reorganisation comprises the following steps shown in FIG. 15:

placing the line corresponding to the spatial direction $d_{opt}$ corresponding to the lowest energy level Emin on the block in question, by departing from the top left corner, and displacing it as far as the point where the segment of this line that cuts the block is longest, filling a line of the reorganised block according to the following approach:

scanning the segment, each new pixel encountered being assigned to the next pixel of the reorganised block, then shifting the segment of a pixel upwards or downwards to fill the line preceding or following the reorganised block.

According to another embodiment, the reorganisation of pixels comprises the interpolation of pixels reorganised by rotation of the source block according to an angle opposed to the angle of the spatial direction corresponding to the lowest energy level, these angles being determined with respect to the horizontal direction, as shown in FIG. 8 in the specific case of direction 6. The reorganised block Bres is represented on the right side of FIG. 8 in thick black dots. The pixel of the turned block mainly contained in a pixel of the reorganised block is assigned to this pixel of the reorganised block as shown in the right part of FIG. 8. In other words, the pixel of the turned block that is covering the largest part of a pixel of the reorganised block is assigned to this pixel as shown in the right part of FIG. 8.

FIG. 9 shows a method for coding a sequence of images divided into blocks in the form of a stream of coded data F. The method is described for a current block Bc and may be applied to several blocks of an image.

During a step 20, a prediction block Bpred is determined for a current block Bc. For example, the prediction block Bpred is determined from motion data obtained by a block matching type motion estimation method.

During a step 22, the residual block Bres is determined by extracting from the current block Bc, the prediction block Bpred. For example, the residual block Bres is equal to the pixel to pixel difference between the current block Bc and the prediction block.

According to a variant, the residual block Bres is equal to the difference between filtered versions of current and prediction blocks, according to an equation of type $$Bres(i, j) = \sum_{(k,l)} a'(k, l) * Bcur(i+k, j+l) - wp_{cr\_dec} * \sum_{(k,l)} b'(k, l) * Bpred(i+k, j+l)$$

where a'( ) and b'( ) are the coefficients of linear filters possibly different to the coefficients a( ) and b( ) defined previously. (k,l) are integer numbers that vary for example from −1 to 1. As a simple example, a'( ) may take the following values:

| 1/256 | −18/256 | 1/256 |
|---|---|---|
| −18/256 | 324/256 | −18/256 |
| 1/256 | −18/256 | 1/256 | and b'( ) the following values

| | | |
|---|---|---|
| 1/64 | 6/64 | 1/64 |
| 6/64 | 36/64 | 6/64 |
| 1/64 | 6/64 | 1/64 |

During a step 24, the residual block Bres is reorganised according to the content of the prediction block Bpred. More specifically, the residual data of the residual block are reorganised. Step 24 of the method for coding is identical to step 14 of the method for decoding. Hence, the different embodiments as well as their variants described in reference to FIGS. 5, 6 7 and 8 apply in the same way in step 24.

During a step 26, the residual block Bres is coded. FIG. 10 shows step 26. This step 20 generally comprises a step 260 of transformation of the residual block into a block of coefficients T(Bres), a step 262 of quantization of the block of coefficients T(Bres) into a block of quantized coefficients Q(T(Bres)) and a step 264 of actual coding of the block of quantized coefficients Q(T(Bres)) into coded data. The purpose of the transformation and quantization of the residual block Bres, for example using a DCT (Discrete Cosine Transform) is to compact the data in the residual block, i.e. to represent it by a small number of non-null coefficients. The actual coding of the transformed and quantized residual block, i.e. of the block of quantized coefficients, comprises the entropy coding of quantized coefficients according to a scanning order of coefficients in the block of quantized coefficients.

The result of the reorganisation steps 14 and 24 of the residual block is to increase the efficiency of the transform and quantization. In fact, the data in the transformed and quantized block are more compact, and organised in priority according to the vertical and horizontal axes, the axes on which the transform (generally able to be separated and thus applied horizontally then vertically) is most efficient. Thus the coefficients having the highest amplitudes are more likely to be found on the top lines and the left columns of the transformed block, and conversely the lowest values are more likely to be found towards the bottom right of the transformed block.

In order to increase this effect, the scanning order of coefficients during step 100 of the decoding method and during step 264 of the coding method is determined according to the content of the prediction block. In fact, the transforms will potentially have specific properties according to the way that the residual data have been reorganised. In particular in the case where one of the directions 3 to 8 is determined in step 142, the pixels are reorganised in such a way that the data are coherent horizontally as shown in FIG. 7. In these cases, the scanning order is preferentially a vertical scanning as shown in FIG. 11, as the transform will concentrate the coefficients on the first column as a priority. For the other directions (0, 1 and 2), a standard zigzag type scanning can be used.

According to a variant shown in FIG. 12, the scanning order is determined from the prediction block reorganised in the manner of the residual block Bres. During a step 30, the prediction block Bpred is filtered by a high pass filter, i.e. a filter enabling the pixels of the prediction bloc Bpred having high frequencies to be located. As a non-restrictive example, a low pass filtering (for example using a median filter, or a convolution in the horizontal then vertical dimensions with a linear filter that can be separated from the coefficients [½, 1, ½]) is applied to Bpred to obtain a low frequency prediction block. The low frequency prediction block is subtracted from the prediction block Bpred to obtain a filtered prediction block Filt(Bpred).

During a step 32, the filtered prediction block Filt(Bpred) is reorganised in the same way as is the residual block in step 14 of the decoding method or in step 24 of the coding method.

During a step 34, the reorganised filtered prediction block Filt(Bpred) is transformed, for example by a DCT, into a block of coefficients T(Filt(Bpred)).

During a step 36, the scanning order is determined from the block of coefficients T(Filt(Bpred)). For example, the scanning order is determined so as to scan the coefficients of the block of coefficients T(Filt(Bpred)) in descending order of value.

The scanning order thus determined is applied during steps 100 of the decoding method and 264 of the coding method.

The invention also relates to a coding device 12 described in reference to FIG. 13 and a decoding device 13 described in reference to FIG. 14. In FIGS. 13 and 14, the modules shown are functional units, that may correspond or not to physically distinguishable units. For example, these modules or some of them can be grouped together in a single component, or constitute functions of the same software. Conversely, some modules may be composed of separate physical entities.

In reference to FIG. 13, the coding device 12 receives at input images belonging to a sequence of images. Each image is divided into blocks of pixels each of which is associated with at least one item of image data. The coding device 12 notably implements a coding with temporal prediction. Only the modules of the coding device 12 relating to the coding by temporal prediction or INTER coding are shown in FIG. 12. Other modules not shown and known by those skilled in the art of video coders implement the INTRA coding with or without spatial prediction. The coding device 12 notably comprises a calculation module 1200 able to extract, for example by subtraction pixel by pixel, from a current block Bc a prediction block Bpred to generate a block of residual image data or residual block Bres. Advantageously, the coding device according to the invention comprises a reorganisation module 1201 of residual data of the residual block Bres according to the prediction block Bpred. The reorganisation module 1201 is adapted to implement step 24 of the coding method according to any one of the embodiments described. It also comprises a module 1202 able to transform then quantize the residual block Bres into a block of quantized coefficients. The transform T is for example a discrete cosine transform (or DCT). The coding device 12 further comprises an entropy coding module 1204 able to code the block of quantized coefficients into a stream F of coded data. For this purpose, the entropy coding module 1204 codes the quantized coefficients according to a given scanning order. This scanning order is for example fixed. According to a variant shown in FIG. 13 by a dotted line, the entropy coding module 1204 determines for each block to be coded a scanning order according to the content of the prediction block Bpred for example in accordance with step 30 to 36. The coding device 12 also comprises a module 1206 carrying out the inverse operation of the module 1202. The module 1206 carries out an inverse quantization $Q^{-1}$ followed by an inverse transform $T^{-1}$. The module 1206 is connected to a calculation module 1208 able to merge, for example by addition pixel by pixel, the block of data from the module 1206 and the prediction block Bpred to generate a block of reconstructed data that is stored in a memory 1210. The coding device 12 also comprises a motion estimation module 1212 able to estimate at least one motion vector between the block Bc and a block of a reference image Ir stored in the memory 1210, this image having been previously coded then reconstructed. According to a variant, the motion estimation can be carried out between the current block Bc and the original reference image 1c in which case the memory 1210 is not connected to the motion estimation module 1212. According to a method well known to those skilled in the art, the motion estimation module searches the reference image Ir for an item of motion data, notably a motion vector in such a manner as to minimize an error calculated between the current block Bc and a block in the reference image Ir identified by means of the item of motion data.

The motion data determined are transmitted by the motion estimation module 1212 to a decision module 1214 able to select a coding mode for the block Bc in a predefined set of coding modes. The coding mode retained is for example that which minimizes a bitrate-distortion type criterion. However, the invention is not restricted to this selection method and the mode retained can be selected according to another criterion for example an a priori type criterion. The coding mode selected by the decision module 1214 as well as the motion data, for example the item or items of motion data in the case of the temporal prediction mode or INTER mode are transmitted to a prediction module 1216. The coding mode selected and in the contrary case the item or items of motion data are also transmitted to the entropy coding module 1204 to be coded in the stream F. The prediction module 1216 determines the prediction block Bpred from the coding mode determined by the decision module 1214 and possibly from motion data determined by the motion estimation module 1212 (inter-images prediction).

In reference to FIG. 14, the decoding module 13 receives at input a stream F of coded data representative of a sequence of images. The stream F is for example transmitted by a coding device 12 via a channel. The decoding device 13 comprises an entropy decoding module 1300 able to generate a block of decoded coefficients $B_Q$ according to a scanning order of the block $B_Q$. This scanning order is for example fixed. According to a variant, shown in FIG. 14 by a dotted line, the entropy decoding module 1300 determines for each block a scanning order according to the content of the prediction block Bpred for example in accordance with steps 30 to 36. The decoding device 13 is also adapted to decode the coding modes and possibly the motion data.

The decoding device 13 also comprises a motion data reconstruction module. According to a first embodiment, the motion data reconstruction module is the entropy decoding module 1300 that decodes a part of the stream F representative of said motion data. According to a variant not shown in FIG. 14, the motion data reconstruction module is a motion estimation module. This solution for reconstructing motion data via the decoding device 13 is known as "template matching".

The block of decoded coefficients $B_Q$ is then transmitted to a module 1302 able to carry out an inverse quantization followed by an inverse transform to reconstruct a residual block Bres. The module 1302 is identical to the module 1206 of the coding device 12 having generated the coded stream F. The module 1302 is connected to a reorganisation module 1303 of residual data of the residual block Bres according to the prediction block Bpred. The reorganisation module 1303 is adapted to implement step 14 of the decoding method according to any one of the embodiments described. The reorganisation module 1303 is identical to the reorganisation module 1201 of the coding device 12. It also comprises a calculation module 1304 able to merge, for example by addition pixel by pixel, the block from the module 1302 and a prediction module Bpred to generate a reconstructed current block Bc that is stored in a memory 1306. The decoding module 13 also comprises a prediction module 1308 identical to the module 1216 of the coding device 12. The prediction module 1308 determines the prediction block Bpred from the coding mode decoded for the current block by the entropy decoding module 1300 and possibly from motion data determined by the motion data reconstruction module.

Naturally, the invention is not limited to the embodiment examples mentioned above.

In particular, those skilled in the art may apply any variant to the stated embodiments and combine them to benefit from their various advantages. The invention is in no way restricted by the filter type used to calculate the energy levels. In fact, these can also be calculated from non-linear median type filters instead of linear filters D1 to D8 described above. The filters used must simply enable the spatial directions along which the signal has the lowest frequencies to be determined.

What is claimed is:

1. A method for decoding a stream of coded data representative of a sequence of images divided into blocks comprising the following steps for a current block:

reconstructing a residual block of residual data from the decoding of a first part of the coded stream of data relating to the current block, determining a prediction block, reconstructing the current block by merging said residual block and said prediction block, reorganising residual data in said residual block before the reconstruction of said current block according to the content of said prediction block, wherein the step of reorganisation of residual data in said residual block comprises the following steps:

calculating, for at least two spatial directions, an energy level of spatial gradients of the prediction data, and determining the reorganisation of residual data according to the spatial direction corresponding to the lowest energy level.

2. A method for decoding according to claim 1, wherein the step of reconstruction of said residual block comprises the following steps:

decoding said first part of the stream of coded data into a block of decoded coefficients according to a scanning order of said block of decoded coefficients determined according to the content of said prediction block, dequantizing the block of decoded coefficients into a block of dequantized coefficients, and transforming said block of dequantized coefficients into the residual block.

3. A method for decoding according to claim 2, wherein the scanning order is determined according to at least the following steps:

applying a high pass filter on the prediction block, reorganising the data in said filtered prediction block in the same way as the residual data in said residual block, transforming said filtered and reorganised prediction block into a block of coefficients, determining the scanning order in such a way as to scan said coefficients in descending order of value.

4. A method for decoding according to claim 1, wherein the energy level of spatial gradients is calculated for a given spatial direction d according to the following equation:

$$E_d = \sum_{(i,j) \in F_d} |F_d(i, j)|, \text{ with } F_d(i, j) = (B_{pred} * D_d)(i, j)$$

where:
- (i, j) represents the coordinates of a pixel of the filtered prediction block Bpred,
- * is the convolution operator,
- |.| corresponds to a standard operator, and
- $D_d$ corresponds to a convolution mask defined by the spatial direction d.

5. A method for decoding according to claim 1, wherein the step of reorganisation of residual data in said residual block also comprises a step of calculation of an additional energy level from the energy levels of spatial gradients calculated in at least two spatial directions.

6. A method for coding a sequence of images divided into blocks comprising the following steps for a current block:
- determining a prediction block for said current block,
- determining a residual block of residual data by extracting from said current block said prediction block,
- coding said residual block,
- reorganising residual data in said residual block before its coding according to the content of said prediction block, wherein the step of reorganisation of residual data in said residual block comprises the following steps:
  - calculating, for at least two spatial directions, an energy level of spatial gradients of the prediction data, and
  - determining the reorganisation of residual data according to the spatial direction corresponding to the lowest energy level.

7. A method for coding according to claim 6, wherein the step of coding of said residual block comprises the following steps:
- transforming said residual block into a block of coefficients,
- quantizing said block of coefficients into a block of quantized coefficients, and
- coding said quantized coefficients according to a scanning order of said block of quantized coefficients determined according to the content of said prediction block.

8. A method for coding according to claim 7, wherein the scanning order is determined according to at least the following steps:
- applying a high pass filter on the prediction block,
- reorganising the data in said filtered prediction block in the same way as the residual data in said residual block,
- transforming said filtered and reorganised prediction block into a block of coefficients,
- determining the scanning order in such a way as to scan said coefficients in descending order of value.

9. A video decoder for decoding a stream of coded data representative of a sequence of images divided into blocks comprising:
- a physical module configured to reconstruct a residual block of residual data from the decoding of a first part of the coded stream of data relating to a current block,
- a physical module configured to determine a prediction block,
- a physical module configured to reconstruct the current block by merging said residual block and said prediction block, and
- a physical module configured to reorganise residual data in said residual block before the reconstruction of said current block according to the content of said prediction block, wherein said physical module configured to reorganise residual data in said residual block comprises:
  - a physical module configured to calculate, for at least two spatial directions, an energy level of spatial gradients of the prediction data, and
  - a physical module configured to determine the reorganisation of residual data according to the spatial direction corresponding to the lowest energy level.

10. A video decoder according to claim 9, wherein the physical module configured to reconstruct said residual block is configured to perform at least:
- decoding said first part of the stream of coded data into a block of decoded coefficients according to a scanning order of said block of decoded coefficients determined according to the content of said prediction block,
- dequantizing the block of decoded coefficients into a block of dequantized coefficients, and
- transforming said block of dequantized coefficients into the residual block.

11. A video decoder according to claim 10, wherein the scanning order is determined according to at least:
- applying a high pass filter on the prediction block,
- reorganising the data in said filtered prediction block in the same way as the residual data in said residual block,
- transforming said filtered and reorganised prediction block into a block of coefficients, and
- determining the scanning order in such a way as to scan said coefficients in descending order of value.

12. A video decoder according to claim 9, wherein the energy level of spatial gradients is calculated for a given spatial direction d according to the following equation:

$$E_d = \sum_{(i,j) \in F_d} |F_d(i, j)|, \text{ with } F_d(i, j) = (B_{pred} * D_d)(i, j)$$

where,
- (i, j) represents the coordinates of a pixel of the filtered prediction block Bpred,
- * is the convolution operator,
- |.| corresponds to a standard operator, and
- $D_d$ corresponds to a convolution mask defined by the spatial direction d.

13. A video decoder according to claim 9, wherein the physical module configured to reorganise residual data in said residual block is configured to perform at least calculation of an additional energy level from the energy levels of spatial gradients calculated in at least two spatial directions.

14. The video decoder according to claim 9, wherein the physical modules are integrated into a single component.

15. A video coder for coding a sequence of images divided into blocks comprising:
- a physical module configured to determine a prediction block for a current block,
- a physical module configured to determine a residual block of residual data by extracting from said current block said prediction block,
- a physical module configured to code said residual block, and
- a physical module configured to reorganise residual data in said residual block before its coding according to the content of said prediction block, wherein said physical module configured to reorganise residual data in said residual block comprises:

a physical module configured to calculate, for at least two spatial directions, an energy level of spatial gradients of the prediction data, and a physical module configured to determine the reorganisation of residual data according to the spatial direction corresponding to the lowest energy level.

16. A video coder according to claim 15, wherein the physical module configured to code said residual block is configured to perform at least:

transforming said residual block into a block of coefficients, quantizing said block of coefficients into a block of quantized coefficients, and coding said quantized coefficients according to a scanning order of said block of quantized coefficients determined according to the content of said prediction block.

17. A video coder according to claim 16, wherein the scanning order is determined according to at least:

applying a high pass filter on the prediction block, reorganising the data in said filtered prediction block in the same way as the residual data in said residual block, transforming said filtered and reorganised prediction block into a block of coefficients, and determining the scanning order in such a way as to scan said coefficients in descending order of value.

18. The video coder according to claim 15, wherein the physical modules are integrated into a single component.

19. A video decoder for decoding a stream of coded data representative of a sequence of images divided into blocks comprising:

means for reconstructing a residual block of residual data from the decoding of a first part of the coded stream of data relating to a current block, means for determining a prediction block, means for reconstructing the current block by merging said residual block and said prediction block, and means for reorganising residual data in said residual block before the reconstruction of said current block according to the content of said prediction block, wherein means for reorganising residual data in said residual block comprises:

means for calculating, for at least two spatial directions, an energy level of spatial gradients of the prediction data, and means for determining the reorganisation of residual data according to the spatial direction corresponding to the lowest energy level.

20. The video decoder according to claim 19, wherein means for reconstructing said residual block is configured to perform at least:

decoding said first part of the stream of coded data into a block of decoded coefficients according to a scanning order of said block of decoded coefficients determined according to the content of said prediction block, dequantizing the block of decoded coefficients into a block of dequantized coefficients, and transforming said block of dequantized coefficients into the residual block.

21. The video decoder according to claim 20, wherein the scanning order is determined according to at least:

applying a high pass filter on the prediction block, reorganising the data in said filtered prediction block in the same way as the residual data in said residual block, transforming said filtered and reorganised prediction block into a block of coefficients, and determining the scanning order in such a way as to scan said coefficients in descending order of value.

22. The video decoder according to claim 19, wherein the energy level of spatial gradients is calculated for a given spatial direction d according to the following equation:

$$E_d = \sum_{(i,j) \in F_d} |F_d(i, j)|, \text{ with } F_d(i, j) = (B_{pred} * D_d)(i, j)$$

where
(i, j) represents the coordinates of a pixel of the filtered prediction block Bpred,
* is the convolution operator,
|.| corresponds to a standard operator, and
$D_d$ corresponds to a convolution mask defined by the spatial direction d.

23. The video decoder according to claim 19, wherein means for reorganising residual data in said residual block is configured to perform at least calculation of an additional energy level from the energy levels of spatial gradients calculated in at least two spatial directions.

24. The video coder for coding a sequence of images divided into blocks comprising:

means for determining a prediction block for a current block, means for determining a residual block of residual data by extracting from said current block said prediction block, means for coding said residual block, and means for reorganising residual data in said residual block before its coding according to the content of said prediction block, wherein said means for reorganising residual data in said residual block comprises:

means for calculating, for at least two spatial directions, an energy level of spatial gradients of the prediction data, and means for determining the reorganisation of residual data according to the spatial direction corresponding to the lowest energy level.

25. The video coder according to claim 24, wherein the means for coding said residual block is configured to perform at least:

transforming said residual block into a block of coefficients, quantizing said block of coefficients into a block of quantized coefficients, and coding said quantized coefficients according to a scanning order of said block of quantized coefficients determined according to the content of said prediction block.

26. The video coder according to claim 25, wherein the scanning order is determined according to at least:

applying a high pass filter on the prediction block, reorganising the data in said filtered prediction block in the same way as the residual data in said residual block, transforming said filtered and reorganised prediction block into a block of coefficients, and determining the scanning order in such a way as to scan said coefficients in descending order of value.

27. A non-transitory computer-readable medium having one or more executable instructions stored thereon, which when executed by a processor cause the processor to perform a method for decoding a stream of coded data representative of a sequence of images divided into blocks, the method comprising for a current block:

reconstructing a residual block of residual data from the decoding of a first part of the coded stream of data relating to the current block, determining a prediction block, reconstructing the current block by merging said residual block and said prediction block, and reorganising residual data in said residual block before the reconstruction of said current block according to the content of said prediction block, wherein the step of reorganisation of residual data in said residual block comprises:

calculating, for at least two spatial directions, an energy level of spatial gradients of the prediction data, and determining the reorganisation of residual data according to the spatial direction corresponding to the lowest energy level.

28. A non-transitory computer-readable medium having one or more executable instructions stored thereon, which when executed by a processor cause the processor to perform a method for coding a sequence of images divided into blocks, the method comprising for a current block:

determining a prediction block for said current block, determining a residual block of residual data by extracting from said current block said prediction block, coding said residual block, and reorganising residual data in said residual block before its coding according to the content of said prediction block, wherein the step of reorganisation of residual data in said residual block comprises:

calculating, for at least two spatial directions, an energy level of spatial gradients of the prediction data, and determining the reorganisation of residual data according to the spatial direction corresponding to the lowest energy level.

* * * * *